(12) United States Patent
Erikson et al.

(10) Patent No.: US 12,005,793 B2
(45) Date of Patent: Jun. 11, 2024

(54) VEHICLE PASS-THROUGH CHARGING

(71) Applicant: Rivian IP Holdings, LLC, Plymouth, MI (US)

(72) Inventors: Tyler Erikson, Torrance, CA (US); Kyle Underhill, Los Angeles, CA (US); Tyler Jennings Bennett, Long Beach, CA (US); Trent Warnke, Novi, MI (US)

(73) Assignee: Rivian IP Holdings, L.L.C, Irvine, CA (US)

( * ) Notice: Subject to any disclaimer, the term of this patent is extended or adjusted under 35 U.S.C. 154(b) by 433 days.

(21) Appl. No.: 17/559,059

(22) Filed: Dec. 22, 2021

(65) Prior Publication Data
US 2023/0191936 A1 Jun. 22, 2023

(51) Int. Cl.
*B60L 53/16* (2019.01)
*B60L 50/60* (2019.01)
*B60L 53/62* (2019.01)

(52) U.S. Cl.
CPC ............. *B60L 53/16* (2019.02); *B60L 50/60* (2019.02); *B60L 53/62* (2019.02)

(58) Field of Classification Search
CPC ....................................................... B60L 53/16
USPC .......................................................... 320/109
See application file for complete search history.

(56) References Cited

U.S. PATENT DOCUMENTS

| | | | |
|---|---|---|---|
| 2022/0097540 A1* | 3/2022 | Atluri | H02J 7/0048 |
| 2023/0108029 A1* | 4/2023 | Salter | B60K 1/04 |
| | | | 320/109 |
| 2023/0339343 A1* | 10/2023 | King | B60L 53/14 |

* cited by examiner

*Primary Examiner* — Jerry D Robbins
(74) *Attorney, Agent, or Firm* — Foley & Lardner LLP

(57) ABSTRACT

Disclosed embodiments include systems, vehicles, and methods to switchably provide electric power to a battery system and an external system, such as another battery system, from a single charging system or other source of electric power. In an illustrative embodiment, a charging input coupling couplable to an electric power source; a charging output coupling; a battery system coupling couplable to a rechargeable battery system; and an electric switching device electrically couplable to the charging input coupling, the charging output coupling, and the battery system coupling, and configured to selectively operate in an operating mode including at least one of a first mode and a second mode, wherein: in the first mode, the electric switching device directs the electric power to a the battery system coupling, and in the second mode, the electric switching device directs the electric power to the charging output coupling.

20 Claims, 15 Drawing Sheets

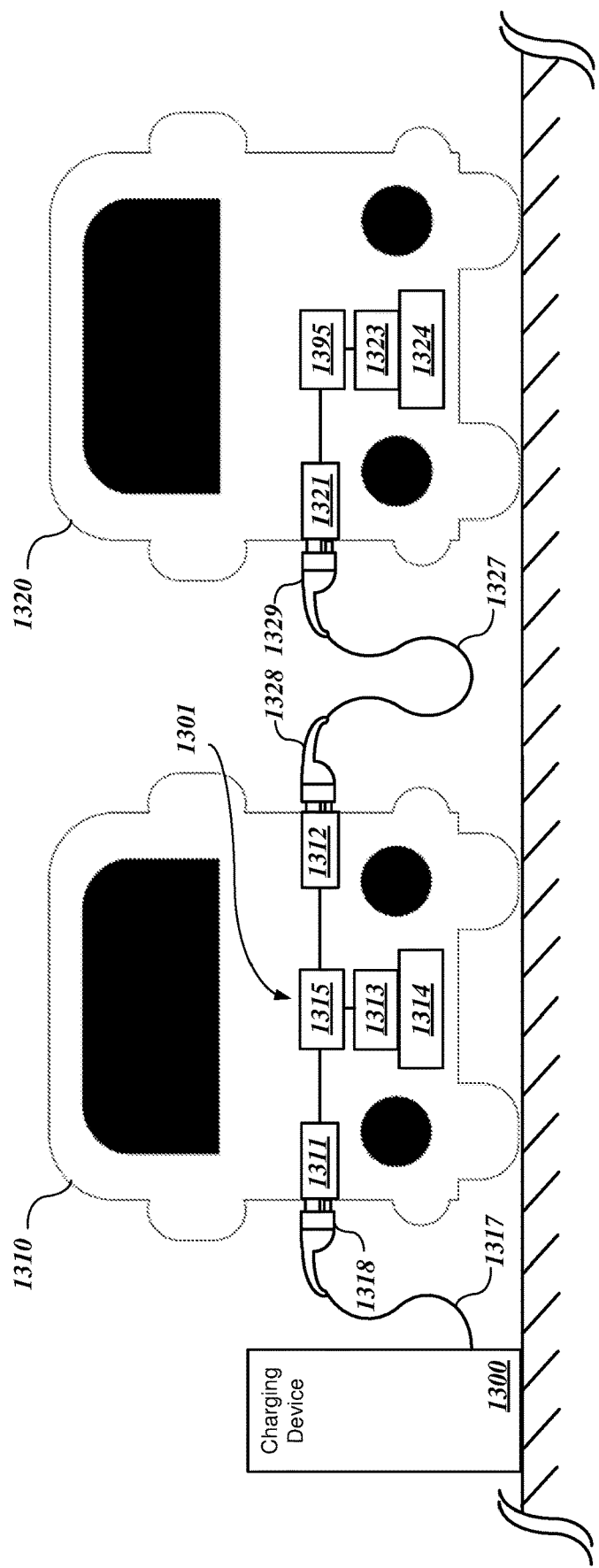

VEHICLE PASS-THROUGH CHARGING

A charging system may be coupled to an electrically-powered vehicle with a charging cable to recharge the vehicle's battery system. Where multiple vehicles may need to be charged, whether it be two vehicles parked next to each other in a private garage or rows of vehicles in a fleet garage, multiple charging systems may need to be provided. However, multiple charging systems may be space-consuming or may increase the difficulty of parking or and moving vehicles in the charging area The statements in this section merely provide background information related to the present disclosure and may not constitute prior art.

SUMMARY

Disclosed embodiments include systems, vehicles, and methods to switchably provide electric power to a battery system and an external system, such as another battery system, from a single charging system or other source of electric power.

In an illustrative embodiment, a charging input coupling couplable to an electric power source; a charging output coupling; a battery system coupling couplable to a rechargeable battery system; and an electric switching device electrically couplable to the charging input coupling, the charging output coupling, and the battery system coupling, and configured to selectively operate in an operating mode including at least one of a first mode and a second mode, wherein: in the first mode, the electric switching device directs the electric power to a the battery system coupling, and in the second mode, the electric switching device directs the electric power to the charging output coupling.

In another illustrative embodiment, a vehicle includes a vehicle body; a drive system; a rechargeable battery system; a charging input coupling configured to receive electric power; a charging output coupling; a battery system coupling couplable to the rechargeable battery system; and an electric switching device electrically couplable to the charging input coupling, the charging output coupling, and the battery system coupling, and configured to selectively operate in an operating mode including at least one of a first mode and a second mode, wherein: in the first mode, the electric switching device directs the electric power to a the battery system coupling, and in the second mode, the electric switching device directs the electric power to the charging output coupling.

In another illustrative embodiment, an illustrative method includes: providing a charging input coupling configured to receive electric power; providing a charging output coupling configured to provide the electric power to an external device; providing a battery system coupling couplable to a rechargeable battery system; and switchably coupling the charging input coupling to the battery system coupling and the charging output coupling to selectively operate in a first mode and a second mode wherein: in the first mode, directing the electric power to a the battery system coupling, and in the second mode, directing the electric power to the charging output coupling.

Further features, advantages, and areas of applicability will become apparent from the description provided herein. It will be appreciated that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings:

FIGS. 12 and 13 is a schematic diagram of multiple vehicles chargeable from a single charging system using the system of FIGS. 1-9;

DETAILED DESCRIPTION

The following description explains, by way of illustration only and not of limitation, various embodiments.

By way of a non-limiting introduction and overview, in various embodiments, a system (which may be incorporated in a vehicle) is configured to switchably provide electric power to a battery system and an external system, such as another battery system, from a single charging system or other electric power source. Thus, for example, in various embodiments, a system enables multiple electrically-powered vehicles to be charged from a single charging system or other power source with a first vehicle providing a pass-through source of power to a second vehicle. The system includes a charging input coupling configured to receive electric power; a charging output coupling; a battery system coupling couplable to a rechargeable battery system; and an electric switching device electrically couplable to the charging input coupling, the charging output coupling, and the battery system coupling, and configured to direct the electric power to either the battery system coupling and the charging output coupling. As a result, electric power may be provided, for example, to recharge multiple vehicles from a single charging system or to provide power to recharge a vehicle and provide electric power to an external electric device from the single charging system or other source of electric power. Thus, for example, a first charging input coupling of a first vehicle may be coupled to a charging system and a second charging input coupling of a second vehicle (or another electric device) may be coupled to a first charging output coupling of the first vehicle. The electric switching device is configured to switchably direct electric power supplied by the charging system to each of the couplings to provide electric power to recharge the first vehicle and to the second vehicle or other external device.

Now that a general overview has been given, details of various embodiments will be explained by way of non-limiting examples given by way of illustration only and not of limitation.

Figure 1:
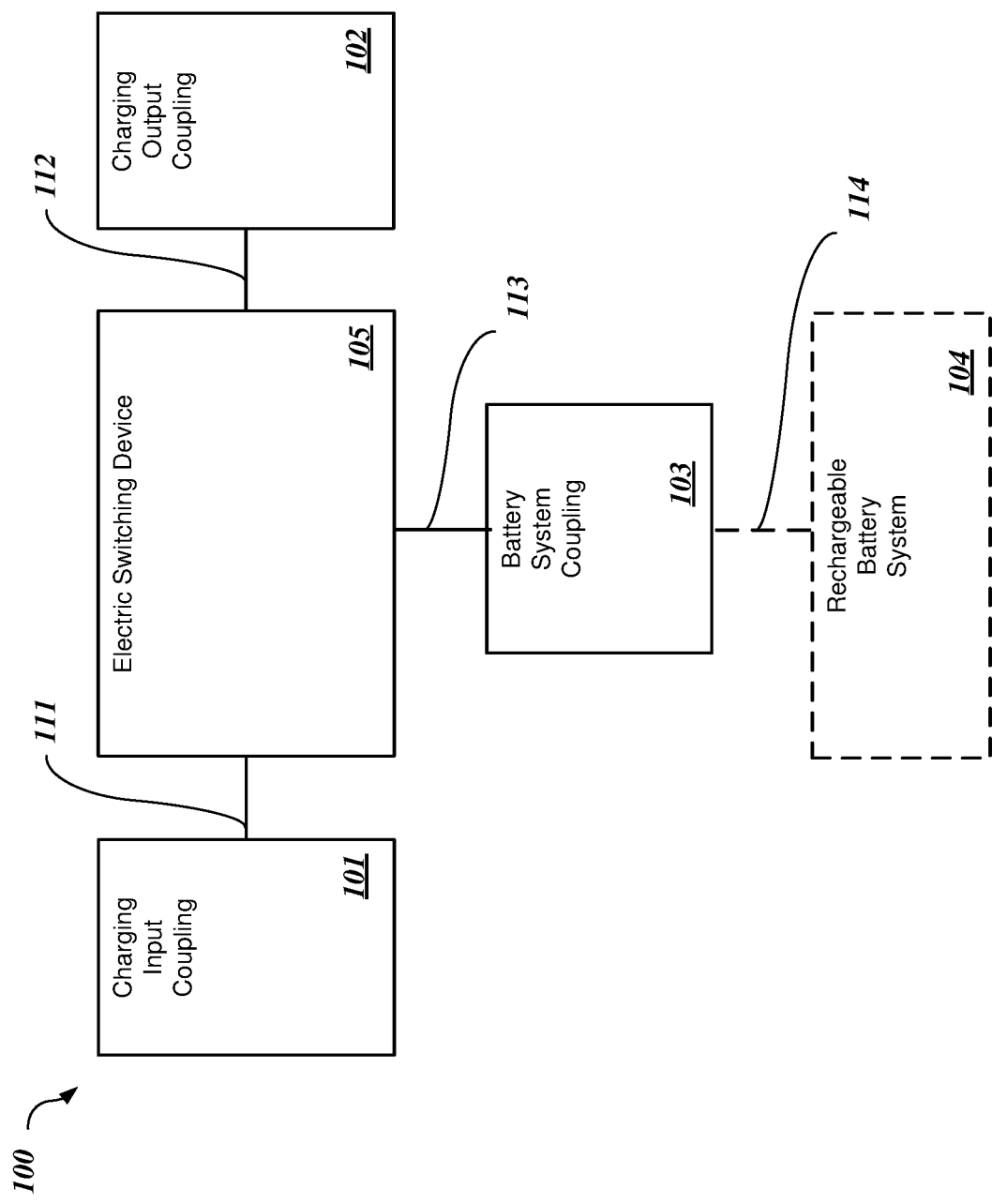
FIGS. 1-9 are block diagrams of an illustrative system to charge multiple vehicles from a single charging system.

Referring to FIG. 1, an illustrative system 100 includes a charging input coupling 101, a charging output coupling 102, a battery system coupling 103, and an electric switching device 105. The charging input coupling 101 is couplable an electric power source (not shown in FIG. 1), such as a charging device or charging system, as further described below. The charging input coupling 101 thus may receive electric power from the electric power source. The charging input coupling 101 is electrically coupled to the electric switching device 105 by an input wiring harness 111 or another electrically conductive apparatus. The charging output coupling 102 is configured to supply power to a separate electric system (not shown in FIG. 1) and is electrically coupled to the electric switching device 105 by an output wiring harness 112 or another electrically conductive apparatus. The charging output coupling 102, in various embodiments, is configured to be coupled to a second vehicle (not shown in FIG. 1) to recharge the battery system of the second vehicle. The battery system coupling 103 is configured to be electrically coupled with a rechargeable battery system 104 via a battery charging harness 114. The rechargeable battery system 104 may include a vehicle battery system, such as that used to power an electrically-power vehicle or a hybrid vehicle. The battery system coupling 103 is electrically coupled to the electric switching device 105 by a battery system wiring harness 113.

In various embodiments, the electric switching device 105 is configured to selectively operate in a first mode and a second mode. In the first mode, the electric switching device 105 directs electric power received at the charging input coupling 101 to the battery system coupling 103. In the second mode, the electric switching device 105 directs electric power from the electric power source to the battery system coupling 103. Thus, for example, the electric switching device 105 may direct electric power to the battery system coupling 103 to recharge the rechargeable battery system 104 in the first mode, or may direct the electric power to the charging output coupling 102 in the second mode. As further described below, the electric switching device 105 may first direct power to one of the couplings 102 and 103 and then to the other coupling 102 or 103. The electric switching device 105 may be configured to respond to signals receivable via the couplings 102 or 103 to determine to which coupling the electric power received via the charging input coupling 101 is directed. The electric switching device 105 may be configured to direct electric power to the coupling 102 or the coupling 103 from which the electric switching device detects a power demand signal indicative of a request for power.

Thus, the electric switching device 105 may be responsive to detect a first power demand signal from the battery system coupling 103 that is indicative of the rechargeable battery system 104 needing to be recharged and to detect a second power demand signal from the charging output coupling 104 that is indicative of the external device requesting power. When the electric switching device 105 detects the first power demand signal from the battery system coupling 103, the electric switching device 105 may be configured to operate in the first mode and direct electric power from the electric power source to the battery system coupling 103 to recharge the rechargeable battery system 104. In various embodiments, the electric switching device 105 is configured to convey the first power demand signal to the charging input coupling 10'. As further described below, when the electric switching device 105 is coupled to another electric switching device or other device configured to be responsive to a power demand signal, the power demand signal is communicated to the charging input coupling 101. When the electric switching device 105 detects the second power demand signal from the charging output coupling 102, the electric switching device may be configured to operate in the second mode and direct electric power from the electric power source to the charging output coupling 102. Correspondingly, the electric switching device 105 is configured to convey the second power demand signal to the charging input coupling 101 to another electric switching device or other device configured to be responsive to a power demand signal.

When both of the couplings 102 and 103 present a power demand signal, the electric switching device 105 may be configured to prioritize one of the couplings 102 or 103 to receive the electric power. In various embodiments, the electric switching device 105 may be configured to select the operating mode to direct the electric power in a sequence chosen from a first sequence and a second sequence. In the first sequence, the electric switching device operates initially in the first mode, to direct electric power to the battery system coupling 103, and then the second mode, to direct electric power to the charging output coupling 102. In the second sequence, the electric switching device operates initially in the second mode, to direct electric power to the charging output coupling 102, and then in the first mode, to direct electric power to the battery system coupling 103. The prioritization of directing electric power is further below.

As further described below, for example, the charging output coupling 102 may be coupled to an additional charging input coupling (not shown in FIG. 1) of another system 100, for example, of another vehicle. The systems may be incorporated into a pair of vehicles (e.g., each having a respective system 100). The charging input coupling 101 of the system of a first vehicle may be electrically coupled to a charging system, such as by connecting a charging cable (not shown in FIG. 1) between the charging system and the charging input coupling 101 of the first vehicle. Another charging cable (not shown in FIG. 1) may be coupled between the charging output coupling 102 of the system 100 of the first vehicle and the charging input coupling 101 of the second vehicle.

The electric switching device 105 thus may direct electric power from the charging system to the battery system coupling 103 to facilitate recharging the rechargeable battery system 104 of the first vehicle or direct the electric power to the charging output coupling 102 to recharge a battery system (not shown in FIG. 1) of the second vehicle or some other device coupled to the charging output coupling 102 of the system 100 of the first vehicle. As a result, electric power may be provided to recharge or otherwise power different vehicles or devices without switching charging cables and without providing separate charging systems or power sources for each of the vehicles or devices.

In various embodiments, as further described below, the electric switching device 105 may be configured to first provide electric power to the battery system coupling 103 to charge the rechargeable battery system 104 until the rechargeable battery system 104 is fully recharged and/or reaches a specified charge level, then direct the electric power to the charging output coupling 102 to power whatever system is connected there. In various other embodiments, as further described below, the electric switching device 105 may be configured to first direct the electric power to the charging output coupling 102 to power whatever system is connected there, then provide electric power to the battery system coupling 103 to charge the rechargeable battery system 104 until the rechargeable battery system 104 is fully recharged and/or reaches a specified charge level.

Figure 2:
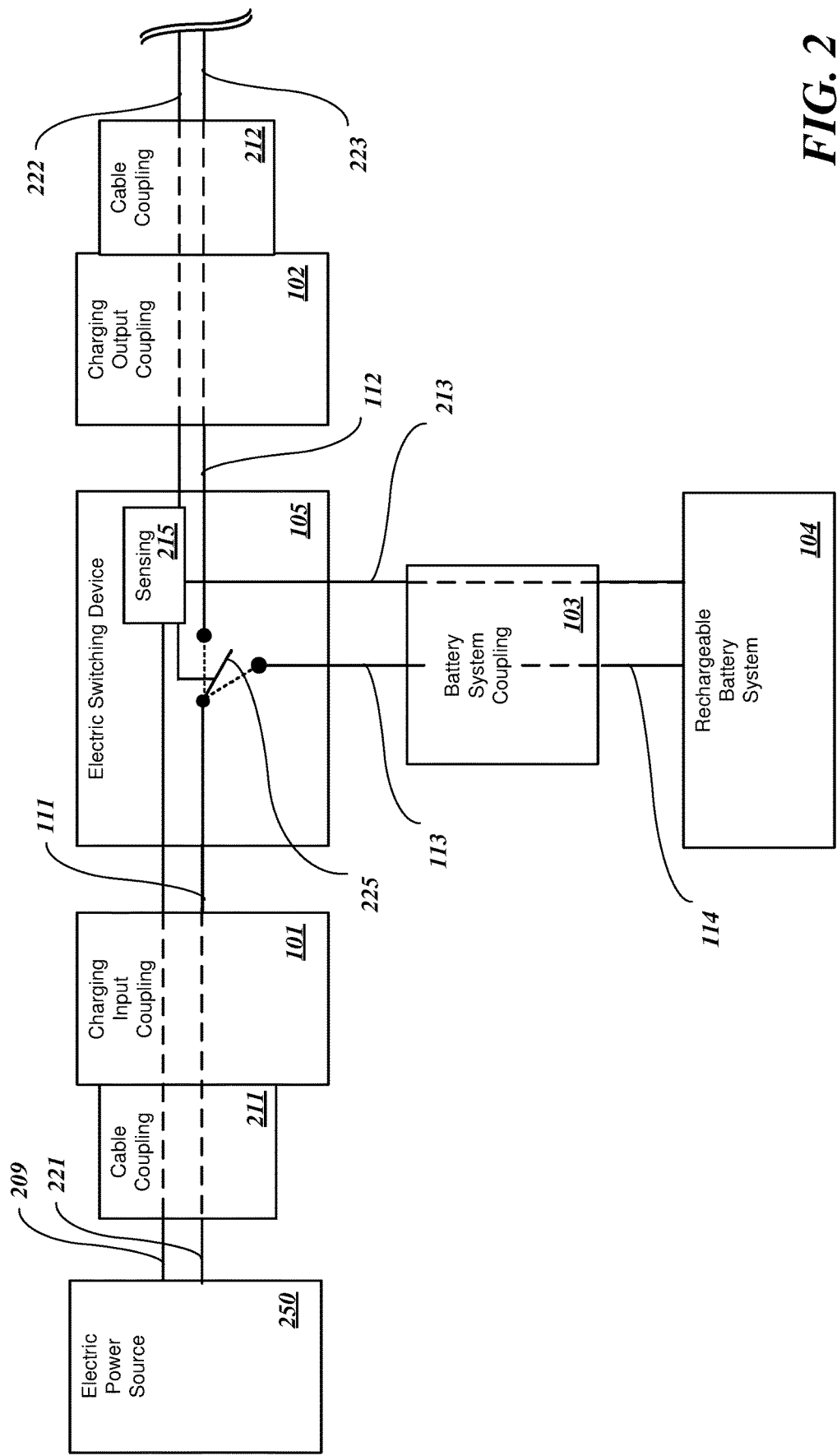

Referring additionally to FIG. 2, in various embodiments the charging input coupling 101 receives a cable coupling 211 connected by a power cable 221 to an electric power source 250, such as a charging device or other source of electric power. The power cable 221 is electrically coupled via the cable coupling 211 and the charging input coupling 101 to the electric switching device 105 via the input wiring harness 111. In various embodiments, a first signal line 209 is also electrically coupled to the cable coupling 211 and is electrically coupled via the cable coupling 211 and the charging input coupling 101 to the electric switching device 105 via the input wiring harness 111. The first signal line 209 may be used to communicate to the electric power source 250 or another device of a need to receive electric power. The electric power source 250 may be responsive to the signal received via the first signal line 209, for example, to power on to provide electric power via the power cable 221. Correspondingly, as further described below, when the charging input coupling 101 is coupled to a charging output coupling 102 of another vehicle, the first signal line 209 may be used to convey a demand for power presented via a second signal line from the electric switching device of that other vehicle.

In FIGS. 1-9, signal lines such as the first signal line 209, the second signal line 210, and other signal lines are diagrammatically shown as wired connections. However, while wired connections may be used to communicate signals, such as power demand signals, it will be appreciated that these signals could be communicated wirelessly between the electric power source 250 and devices to be supplied by the electric power source. Thus, the signal lines could be wireless communications lines communicated by any suitable wireless medium, including radio frequency (RF) communications using Bluetooth communications, IEEE 802.11 Wi-Fi communications, or any other standardized or proprietary communications medium.

In various embodiments the electric switching device 105 is configured to direct the electric power received from the electric power source 250 via the power cable 221 to either the battery system wiring harness 113 or the output wiring harness 112 by a switch 225. The switch 225 may include an electromechanical or a solid state device that is controlled by a sensing circuit 215, which may include an application-specific circuit, a programmable processing device, or another type of circuit capable of switchably directing a flow of electric power.

In various embodiments the sensing circuit 215 is configured to receive and respond to a third signal line 213 from the rechargeable battery system 104 via the battery system wiring harness 113 and the second signal line 222 from an external device (such as another vehicle or another device not shown in FIG. 2) coupled to the charging output coupling 102. The charging output coupling 102 may receive a cable coupling 212 that receives the second signal line 222 coupled to the external device. The charging output coupling 102 also receives an external power line 223 couplable to the external device. The sensing circuit 215 is configured to monitor the second signal line 222 and the third signal line 213 to determine which, if either, of the signal lines 222 and 213 indicates a demand for electric power. Responsive to signals receivable via the signal lines 222 and 213, the sensing circuit 215 controls the switch 225 to direct the electric power, as further described below.

In various embodiments, the sensing circuit 215 is also configured to engage the first signal line 209 to present a power demand signal via the first signal line 209 to the electric power source 250 when the sensing circuit 215 is presented with a power demand signal via the battery system coupling 103 or the charging output coupling 102. Thus, when the sensing circuit 105 is not receiving a power demand signal and, thus, does not transmit a power demand signal to the electric power source 250, the electric power source 250 may not direct any power to the cable coupling 211 and may direct electric power to another recipient.

In various embodiments, when a power demand signal is not presented to the electric power source 250, the electric power source 250 may enter a rest mode or shut down to save power. As described further below, the electric power source 250 may be the charging output coupling 102 of another device. Thus, the sensing circuit 215 suitably includes a connection to the first signal line 209 to be able to convey a power demand signal, for example, from the first signal line 209 to the second signal line 222, eventually to a sensing circuit (not shown) of another system via, in turn causing the sensing circuit of the other system to direct electric power to its respective rechargeable battery system via the cable coupling 211, as further described below with reference to FIG. 12.

Figure 3:
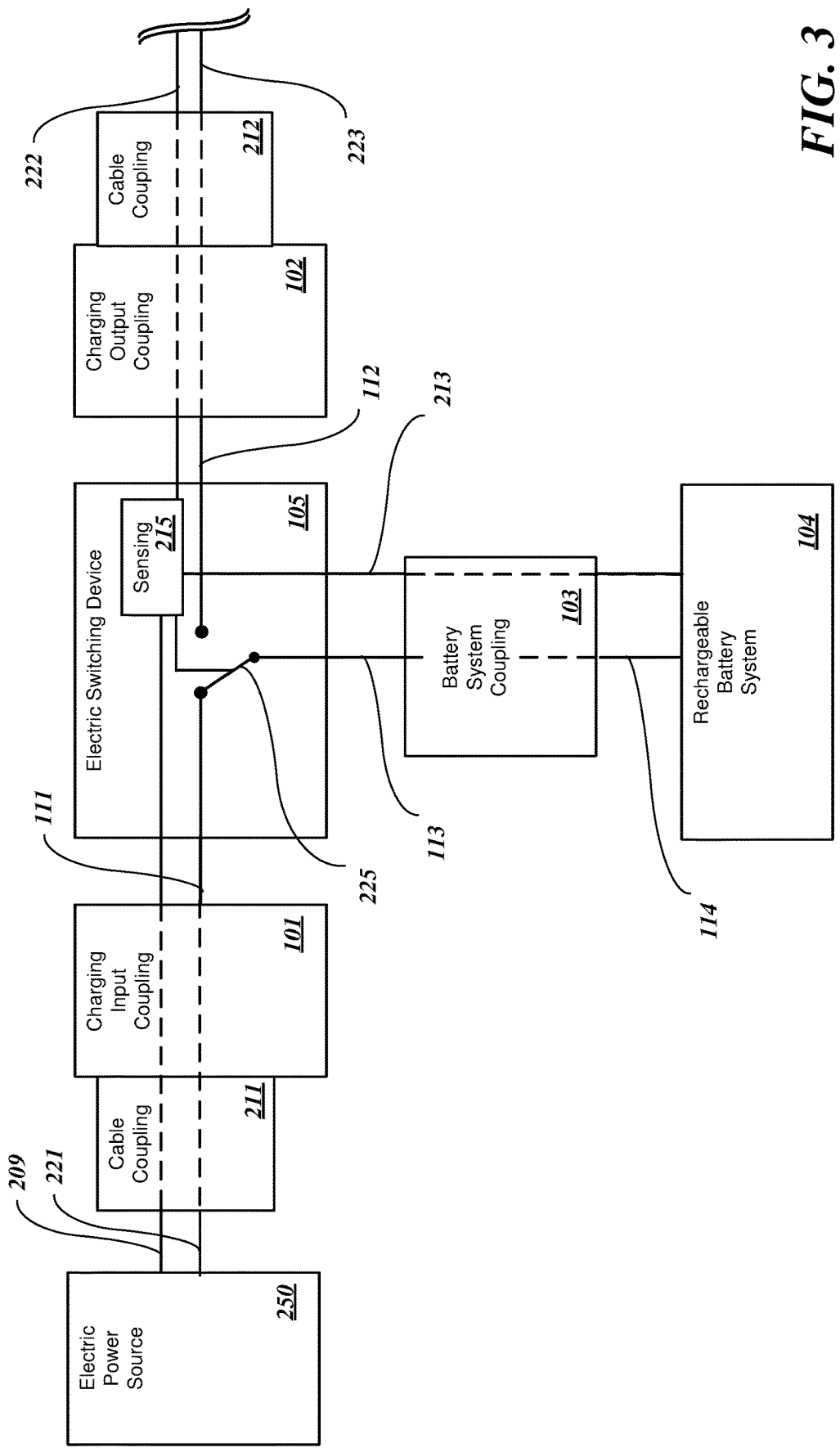
Figure 4:
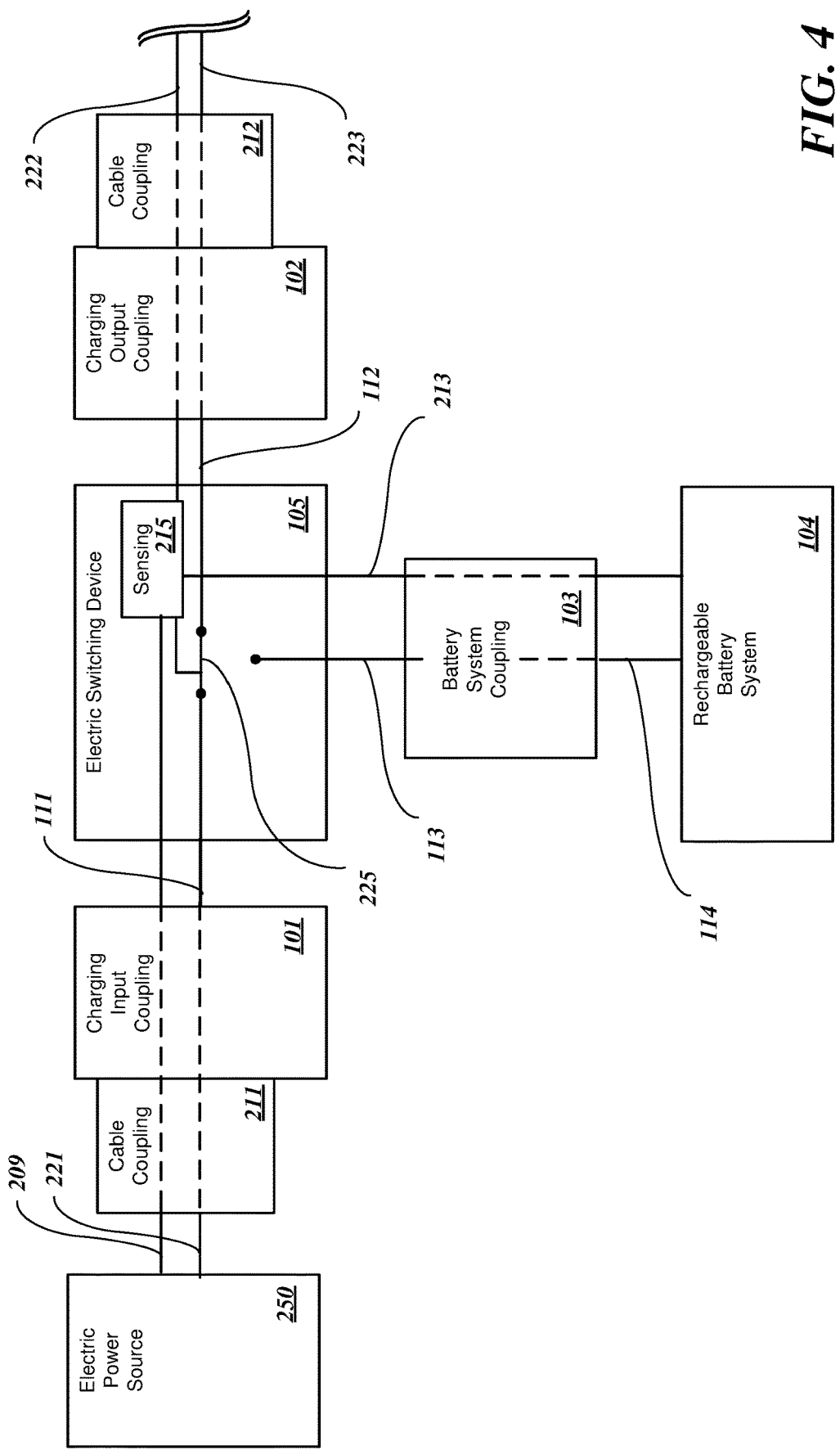

Referring additionally to FIG. 3, in various embodiments the electric switching device 105 is configured to direct electric power received from the electric power source 250 to the rechargeable battery system 104. Based on one or more inputs received via the third signal line 213 or the second signal line 222, as further described below, the sensing circuit 215 controls the switch 225 to direct the flow of electric power from the electric power source 250. For example, when the third signal line 213 communicates a demand for power via the third signal line 213, the electric switching device 105 the sensing circuit 215 directs the switch 225 to electrically couple the input wiring harness 111 to the battery system wiring harness 113 to direct the electric power to the rechargeable battery system 104 via the battery system coupling 103. By contrast, referring additionally to FIG. 4, the electric switching device 105 is configured to direct electric power received from the electric power source 250 via the output wiring harness 112 to the charging output coupling 102. Again, based on one or more inputs received via the second signal line 222, the sensing circuit 215 directs the switch 225 to electrically couple the input wiring harness 111 via the output wiring harness 112 and the charging output coupling 102 to an external device (not shown in FIG. 3) to direct the electric power to the external device via the charging output coupling 102.

Figure 5:
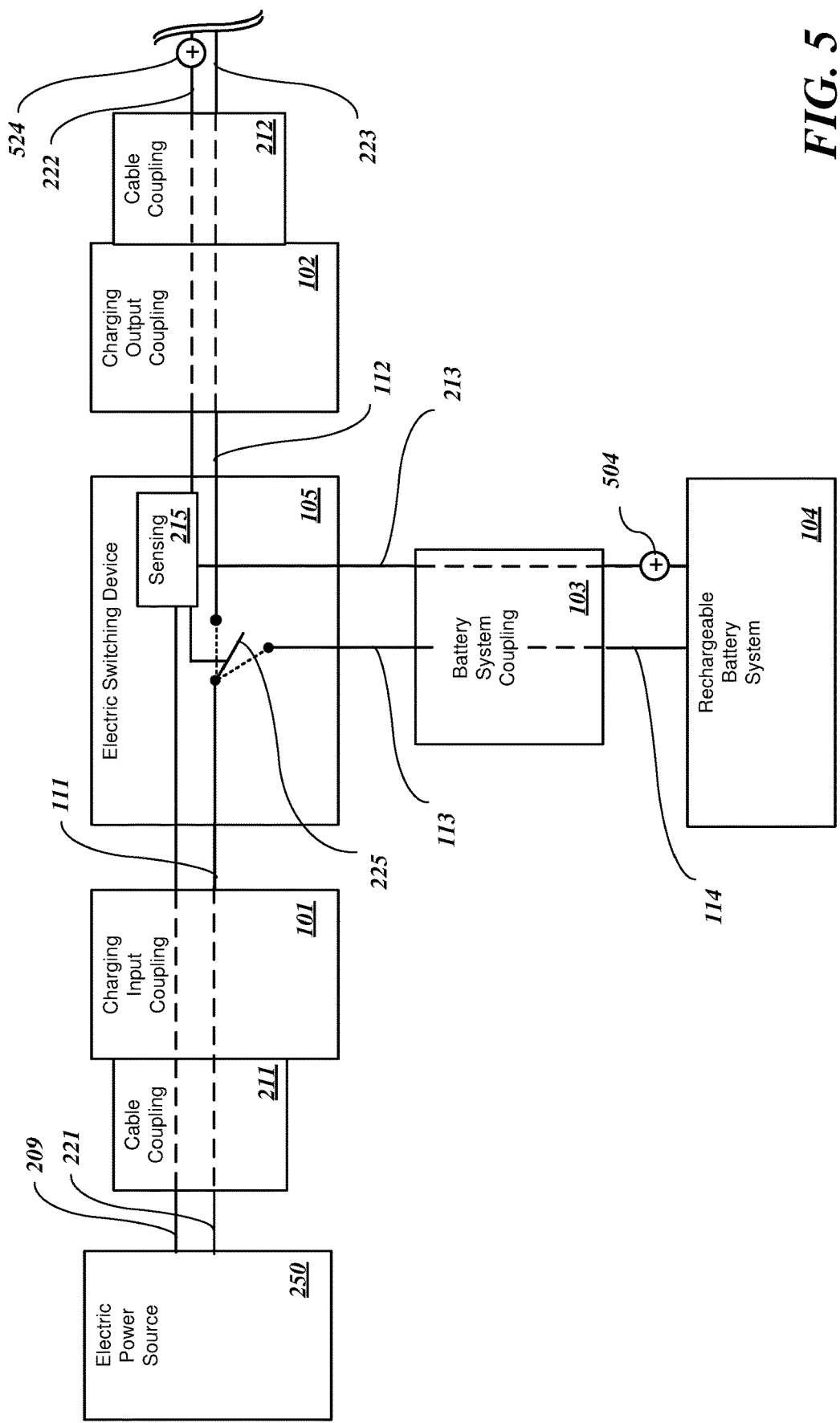

In various embodiments, the sensing circuit 215 of the electric switching device 105 is configured to receive and respond to inputs received via one or more of the signal lines 213 and 222 coupled with the rechargeable battery system 104 and the external device (not shown in FIGS. 2-7), respectively. Referring additionally to FIG. 5, each of the signal lines 213 and 222 may present a power demand signal, represented by "+" signs 504 and 524, respectively, to indicate a demand for power. For example, if the rechargeable battery system 104 is not fully charged or is otherwise below a specified charge level, the rechargeable battery system 104 may generate the power demand signal 504 at the third signal line 213, thereby indicating a request for electric power. Similarly, the external device (not shown), may generate the power demand signal 524 at the second signal line 222 that is electrically couplable via the cable coupling 212 and the charging output coupling 102 to the sensing circuit 215 to present a request for electric power.

The external device may include a rechargeable battery system or other device that may need electric power. In various embodiments, the external device may itself include an embodiment of the system of FIGS. 1-3 and be optionally connected to an additional external device that signals a demand for electric power. Thus, electric power directed by the electric switching device 105 via the output wiring harness 112 to the charging output coupling 102 may pass through the external device coupled to the charging output coupling 102 to one or more other downstream devices. It will be appreciated that multiple systems that use the system 100 may be interconnected in a chain to enable electric power delivery from a single charging device or other electric power source to multiple devices.

Figure 6:
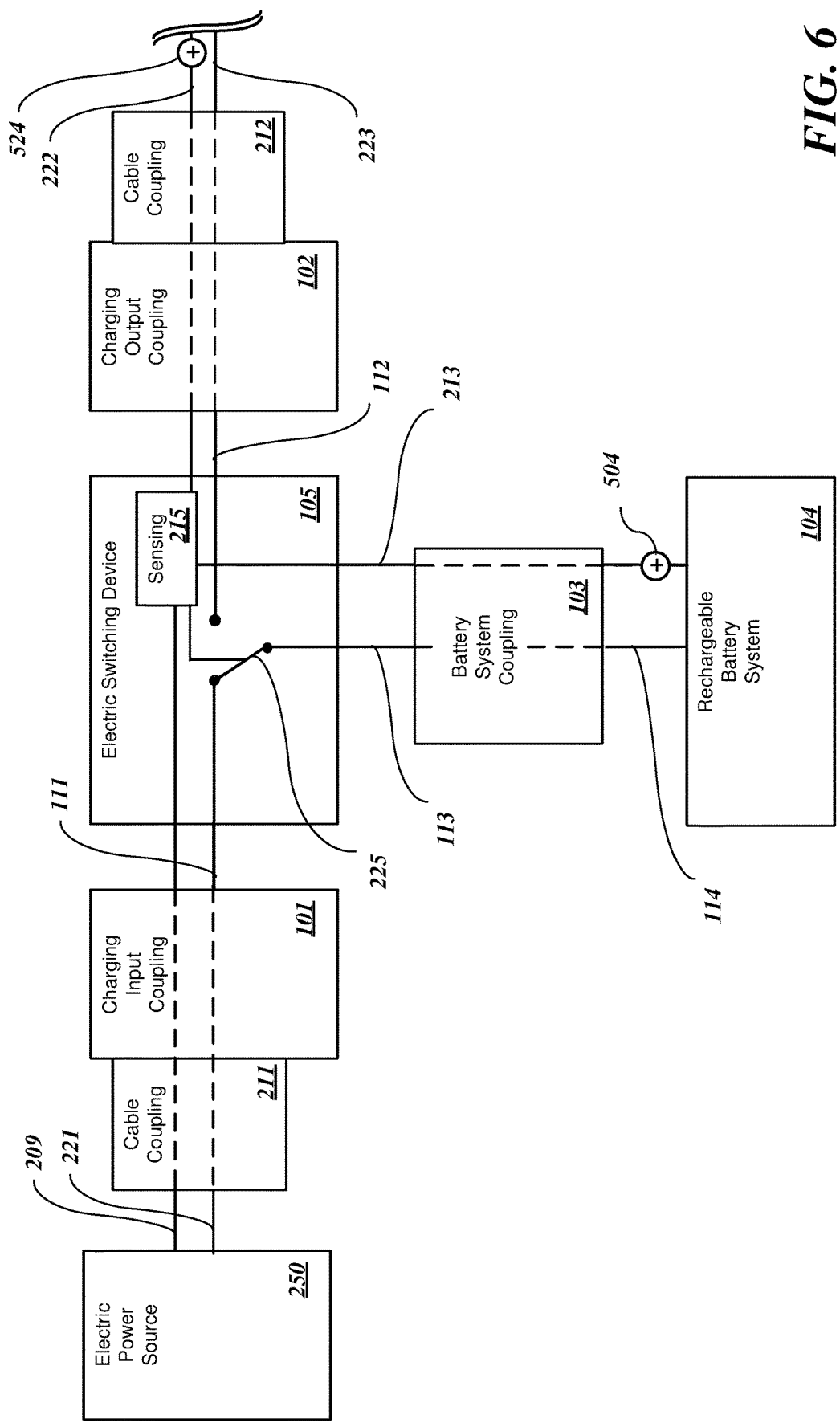

In various embodiments, the electric switching device 105 may be configured to prioritize charging of the rechargeable battery system 104 over other requests for electric power. Referring additionally to FIG. 6, both the rechargeable battery system 104 and the external device (not shown in FIG. 6) generate power demand signals 504 and 524. The electric switching device 105 may be configured to prioritize charging the rechargeable battery system 104 even when both the rechargeable battery system 104 and the external device generate power demand signals 504 and 524. The electric switching device 105 thus directs the switch 225 to channel the electric power to the rechargeable battery system 104 by electrically coupling the input wiring harness 111 to the battery system wiring harness 113.

Figure 7:
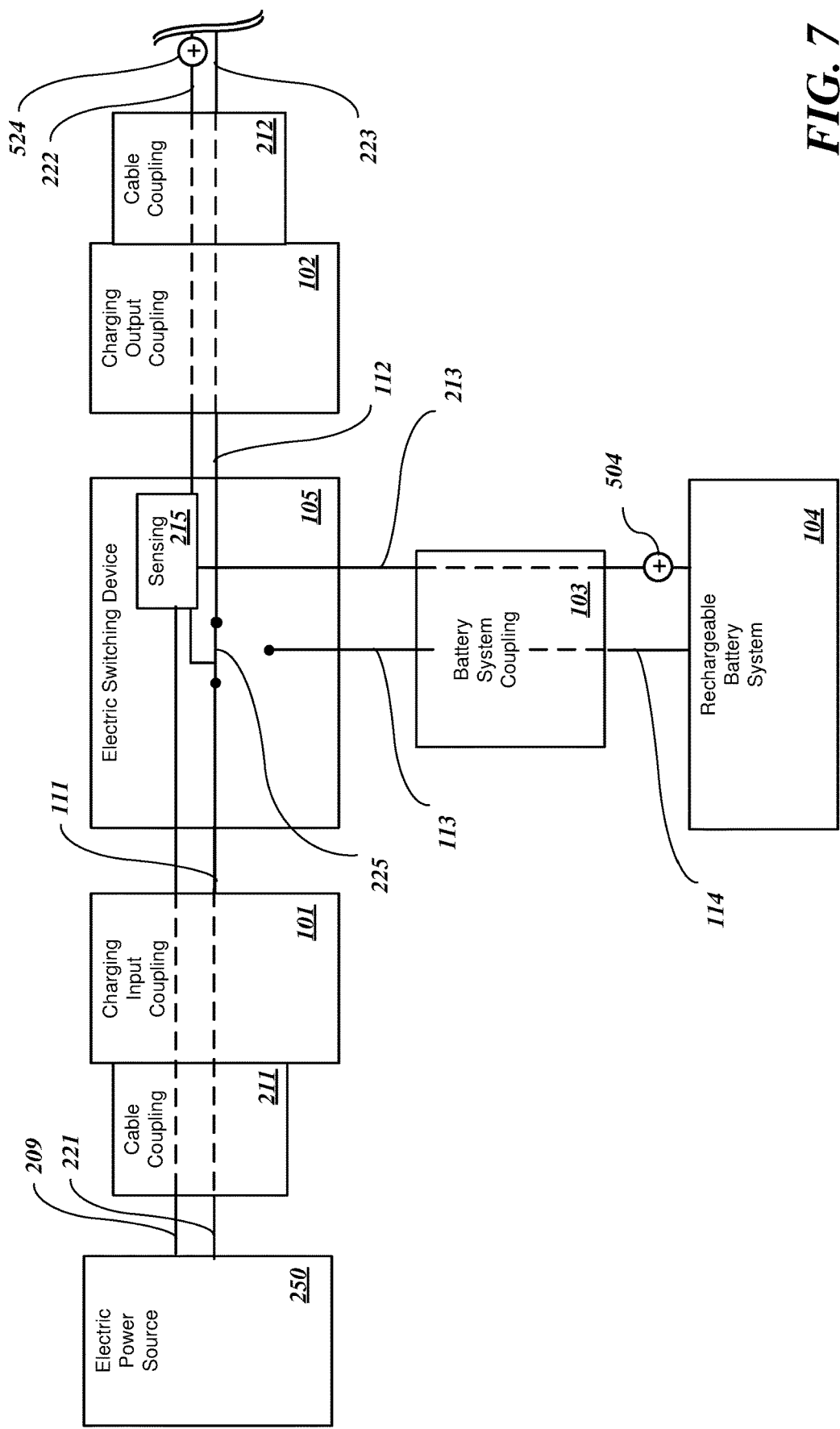

In various embodiments, the electric switching device 105 may be configured to prioritize directing electric power to the external device coupled to the charging output coupling 102 over charging the rechargeable battery system 104. Referring additionally to FIG. 7, again, both the rechargeable battery system 104 and the external device generate power demand signals 504 and 524. In the example of FIG. 7, the electric switching device 105 is configured to prioritize directing power to the external device coupled to the charging output coupling 102 even when both the rechargeable battery system 104 and the external device generate power demand signals 504 and 524. The electric switching device 105 thus directs the switch 225 to channel the electric power to the external device via the charging output coupling 102 by electrically coupling the input wiring harness 111 to the output wiring harness 112.

Figure 8:
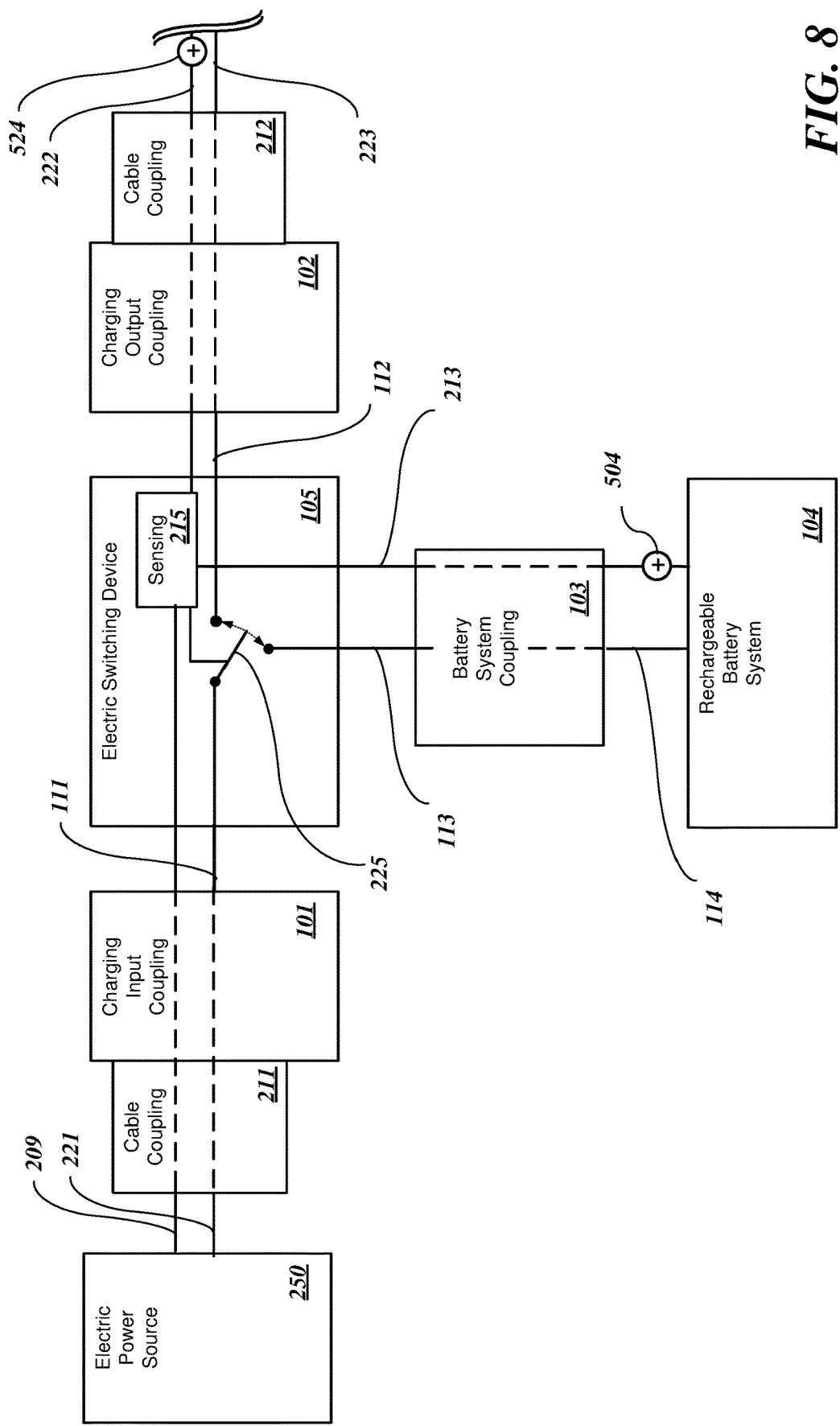

In various embodiments, the electric switching device may be configured to alternately direct electric power between the rechargeable battery system 104 and the external device coupled to the charging output coupling 102. Referring additionally to FIG. 8, the sensing circuit 215 may be configured to control the switch 225 to alternate the provision of electric power from the electric power source 250 between the battery charging harness 115 and the external power line 223. The electric switching device 105 may be configured to periodically redirect the switch 225 between the battery system wiring harness 113 and the output wiring harness 112 at fixed or adaptive intervals. As compared to prioritizing the complete charging of one of the rechargeable battery system 104 and the external device, embodiments that alternately charge both the rechargeable battery system 104 and the external device may be convenient if a system including the rechargeable battery system 104 or the external device were to be used before both the rechargeable battery system 104 and the external device had an opportunity to charge.

For example, if complete charging of the rechargeable battery system 104 is prioritized as described with reference to FIG. 6 but the external device was needed before the rechargeable battery system 104 was fully charged, the external device may not have been charged at all. Similarly, even when the rechargeable battery system 104 and the electric switching device 105 redirects the switch 225 to charge the external device, the external device may only have received a partial charge insufficient for its desired application while the system incorporating the rechargeable battery system 104 may be fully charged but may not be needed. The reverse situations also may arise if complete charging of the external device is prioritized as described with reference to FIG. 7. By switching the charging between the rechargeable battery system 104 and the external device, both the rechargeable battery system 104 and the external device may be at least partially recharged so as to facilitate desired uses for the system incorporating the rechargeable battery system 104 and the external device.

In various embodiments, the electric switching device 105 may be configured to alternately direct the switch between the battery system wiring harness 113 and the output wiring harness 112 at fixed intervals until one or both of the systems is fully charged. Similarly, the intervals may be adaptive, for example, to charge the more depleted system for longer intervals than the less depleted system where the relative intervals are representative of the relative depletion of the systems and/or the capacity of those systems. The intervals also may be subject to user input to adjust the relative length of the intervals.

The prioritization of which device is charged first, whether devices are charged alternately, and/or the switching intervals that may be used when devices are charged alternately, may be handled in several ways. For one example, the electric switching device 105 may be configured to automatically prioritize charging of the rechargeable battery system 104 of the system with which the electric switching device 105 is associated before routing electric power to an external device. On the other hand, the electric switching device 105 may be configured to automatically prioritize provision of power to the external device before charging the rechargeable battery system. The prioritization also could be based on conditions of the rechargeable battery system 104 and the external device such that, e.g., the electric switching device 105 directs electric power to whichever device is more depleted. Additionally, the electric switching device 105 could be configured to respond to a code presented via the second signal line 222 from the external device that may signify a priority standing of the external device that the electric switching device 105 may evaluate to determine whether to prioritize the external device or the rechargeable battery system 104. Further, a local or remote operator may be able to communicate with the electric switching device 105 to determine whether the rechargeable battery system 104 of the external device is prioritized. Also, when the electric switching device 105 is configured or directed to (such as by a local or remote operator), the electric switching device 105 may be configured to use a particular switching interval for each device or be configured to use a relatively longer interval for one of the devices.

It will be appreciated that, when the rechargeable battery system 104 or the device coupled to the charging output coupling 102 has been charged to a predetermined level and/or otherwise on longer needs or requests electric power, the power demand signal it presents will stop. In that case, regardless of the prioritization of charging described with reference to FIGS. 6 and 7 or whether the electric switching device 105 is programmed to alternately charge the systems, the sensing circuit 215 will then direct electric power to the other device until the power demand signal it presents also stops.

In various embodiments, when only one of the power demand signals 504 and 524 is presented, the electric switching device 105 may first direct the electric power to the coupling through which the power demand signal is presented, without regard for priority. In various embodiments, when neither of the power demand signals 504 and 524 is presented, the electric switching device 105 may be configured not to direct electric power to either the battery system coupling 103 or the charging output coupling 102 and electrically or electromechanically decouple the switch 225 from both the battery system wiring harness 113 and the output wiring harness 112, as shown in FIG. 5.

Figure 9:
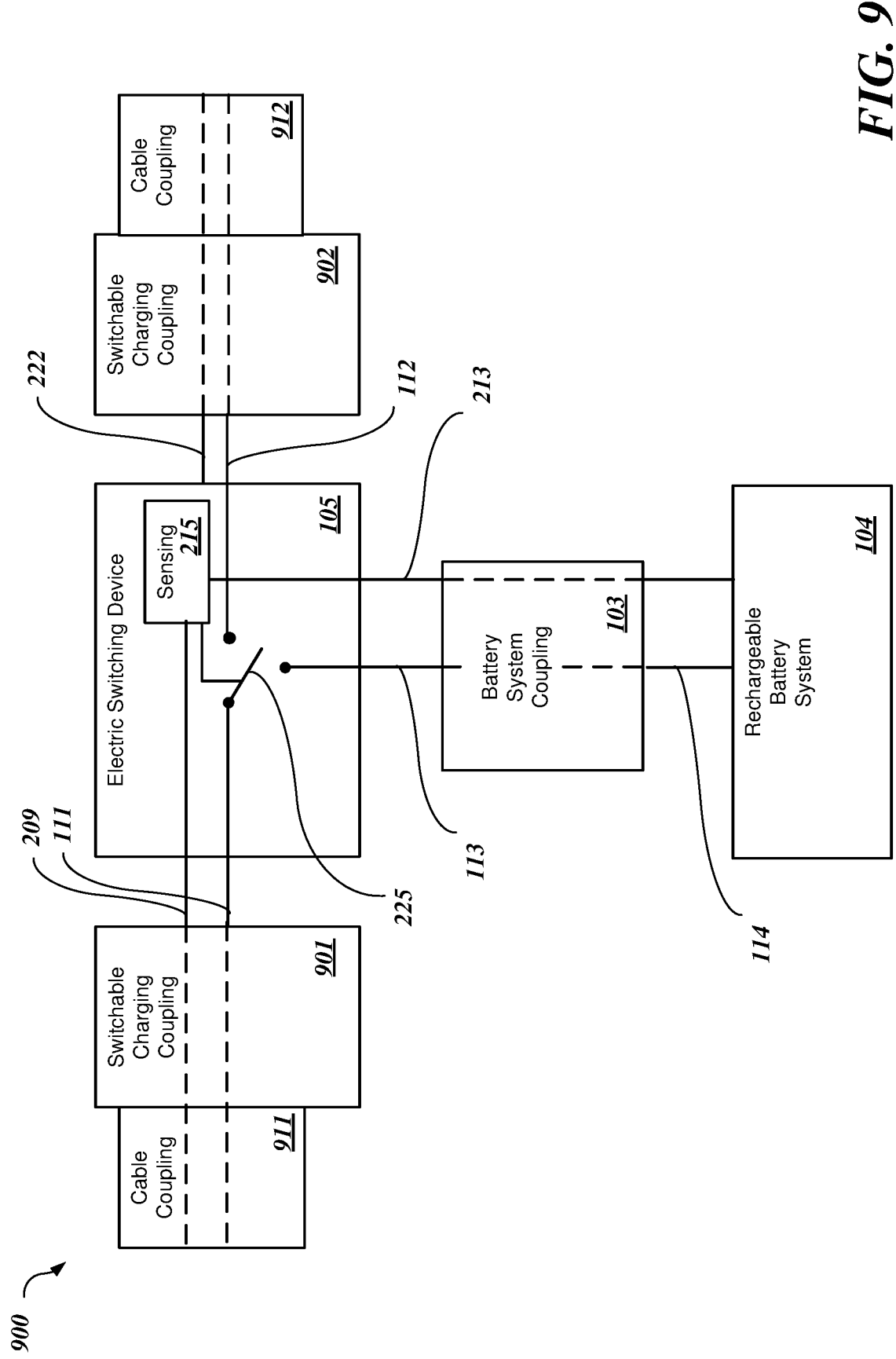

It will be appreciated that, although the systems of FIGS. 1-8 include a charging input coupling 101 and a charging output coupling 102, the couplings 101 and 102 are not limited to being dedicated to the input or output of power, respectively. Referring additionally to FIG. 9, a system 900 includes switchable charging couplings 901 and 902 that either may serve as input or output couplings. Thus, the switchable charging coupling 901 may serve as a charging input coupling and receive a cable coupling 911 from a power source (not shown) and the switchable charging coupling 902 may serve as a charging output coupling and receive a cable coupling 912 to provide power to an external device (not shown), similar to the configuration of the systems described with reference to FIGS. 1-8. On the other hand, the switchable charging coupling 901 may serve as a charging output coupling and receive a cable coupling 911 to provide power to an external device (not shown) and the switchable charging coupling 902 may serve as a charging input coupling and receive a cable coupling 912 to receive electrical power from a power source.

It will be appreciated that, in various embodiments, the electric switching device 105 and/or the switchable charging couplings 901 and 902 may be equipped with dynamic current sensing circuitry and/or switching circuitry to automatically respond to the application of sources of electrical power and/or loads to prevent short circuiting or other problems that may result if sources of power were to be applied at both switchable charging couplings 901 and 902. In various embodiments, the electric switching device 105 and the switchable charging couplings 901 and/or 902 may be manually switchable by a user to indicate which of the switchable charging couplings 901 and/or 902 presents a source of electrical power and/or a load seeking provision of electrical power.

Figure 10:
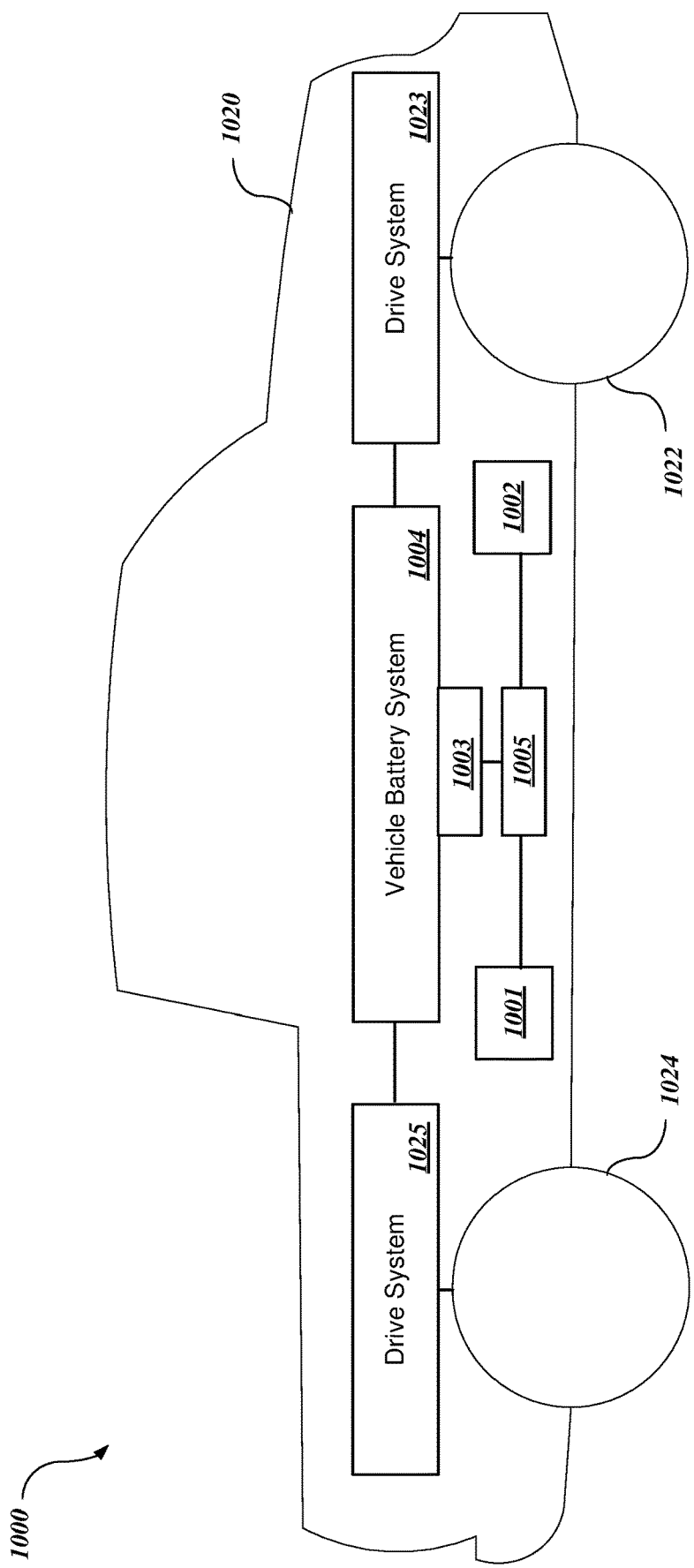
FIGS. 10 and 11 are block diagrams of an illustrative electrically-powered vehicle incorporating the system of FIGS. 1-9.
Figure 11:
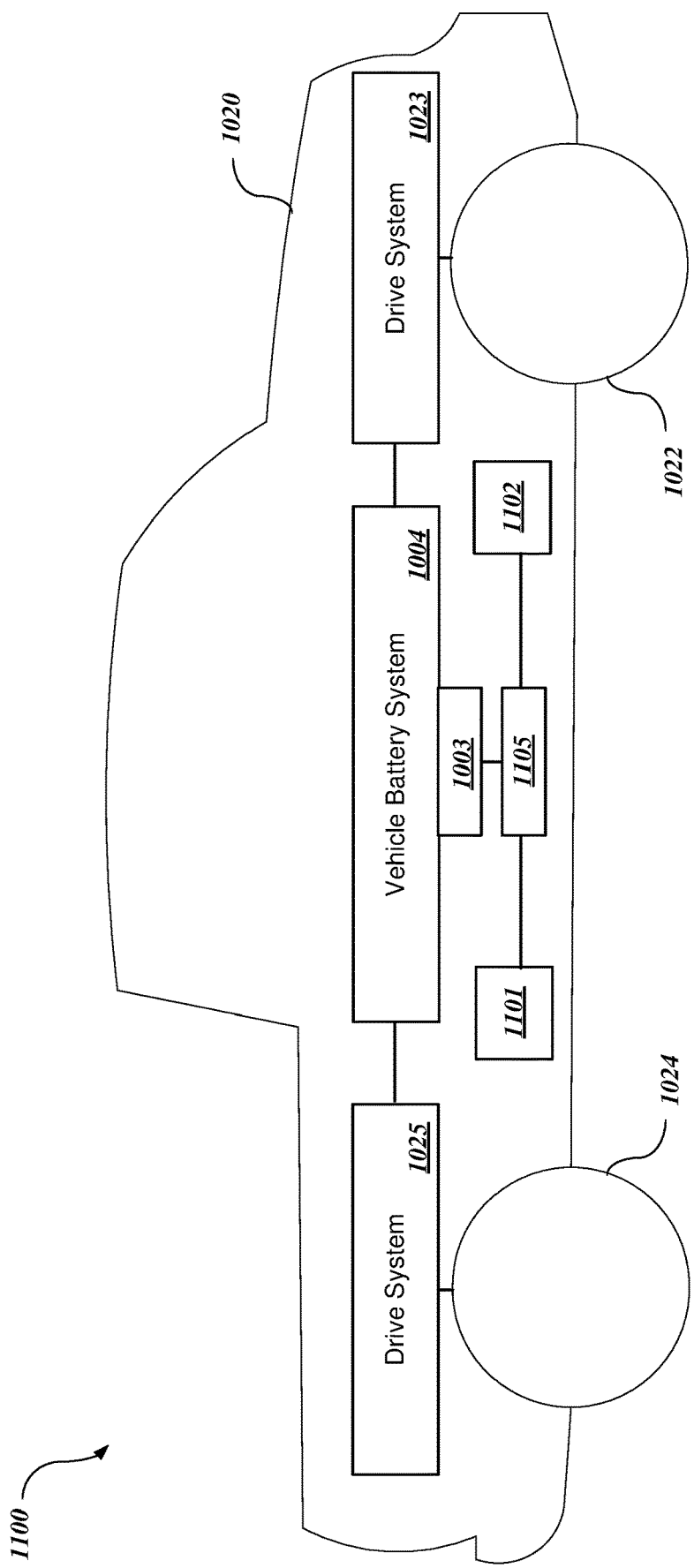

Referring additionally to FIGS. 10 and 11, and as previously described, the system 100 may be used with an electrically-powered vehicle 1000 (FIG. 10) and 1100 (FIG. 11). To provide for interconnection of multiple vehicles, each of the vehicles may incorporate an embodiment of the system 100 (FIG. 1), as further described below. Referring specifically to FIG. 10, the vehicle 1000 may include a vehicle body 1020 and a plurality of wheels, including wheels 1022 and 1024, each of which may be motivated by one or more electrically-powered drive systems 1023 and/or 1025, such as motors, operably coupled with the wheels 1022 and/or 1024, respectively. In various embodiments, the drive systems 1023 and 1025 draw power from a vehicle battery system 1004, which may be an embodiment of the rechargeable battery system 104 (FIGS. 1-7).

Figure 12:
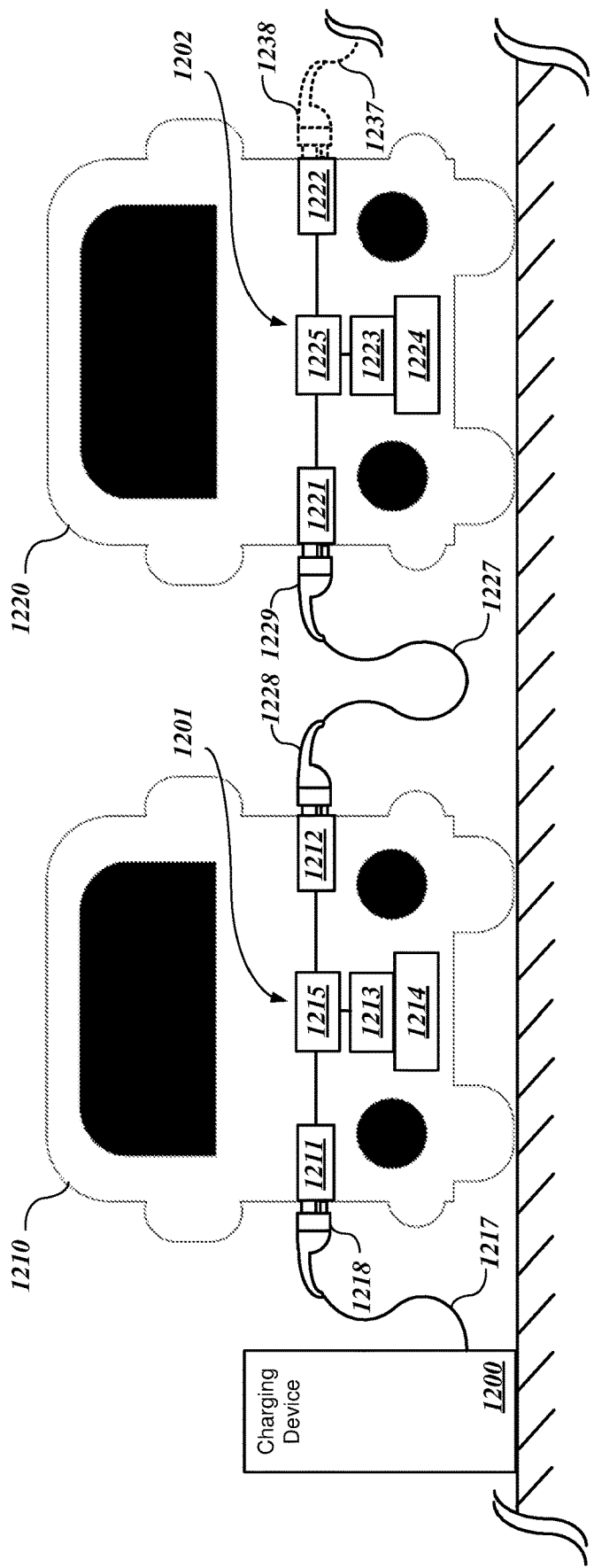

Analogous to the system 100, the vehicle 1000 includes a charging input coupling 101, a charging output coupling 102, and a battery system coupling 103. The battery system coupling 103 may be coupled to the rechargeable battery system 104 of the vehicle 1000. In various embodiments, the components are interconnected by wiring harnesses or other conductive conduits as previously described with reference to FIGS. 1-8. It will be appreciated that, although FIG. 10 shows an electrically-powered, wheeled land vehicle 1000, the system 100 may be integrated with any type of vehicle whatsoever, such as without limitation other land vehicles, aircraft, marine craft, either motor-driven or human-powered or the like. It will also be appreciated that the charging input coupling 101 and the charging output coupling 102 may be positioned on opposing sides of the vehicle 1000, as illustrated in FIGS. 12 and 13, on the same side of the vehicle 1000, and/or on opposing or same ends of the vehicle 1000, or some combination of positions on a side and an end of the vehicle 1000. Embodiments herein described are not limited to any particular placement of the charging input coupling 1001 and the charging output coupling 1002.

Referring additionally to FIG. 11, instead of including a designated charging input coupling 101 and a designated charging output coupling 102 as in the vehicle 1000, the vehicle 1100 includes switchable charging couplings 1101 and 1102, as described with reference to FIG. 9. As a result, either of the switchable charging couplings 1101 and 1102 may receive a cable coupling from a source of power or receive a cable coupling to a device seeking a source of power. As described with reference to FIG. 10, the switchable charging couplings 1101 and 1102 each may be placed at any point on the same or different sides or ends of the vehicle 1100.

Referring additionally to FIG. 12, in various embodiments, the system 100 of FIG. 1 may be incorporated in multiple vehicles, such as the vehicle 1200 of FIG. 8, to enable vehicles 1210 and 1220 to be charged from a single charging device 1200. In various embodiments, a first vehicle 1210 incorporates a system 1201 analogous to the system 100 to enable electric power to be directed to a rechargeable battery system 1214 of the first vehicle 1210 or direct electric power to the second vehicle 1220 to recharge a rechargeable battery system 1224 of the second vehicle 1220 and/or to direct power to another external device (not shown in FIG. 12), as further described below.

The first vehicle 1210 is parked adjacent to the charging device 1200. In various embodiments the system 1201 includes a charging input coupling 1211, a charging output coupling 1212, a battery system coupling 1213 coupled to the rechargeable battery system 1214 of the vehicle 1210, and an electric switching device 1215 which, in various embodiments, are electrically coupled by wiring harnesses or other conductive conduits as previously described with reference to FIGS. 1-9. The charging input coupling 1211 of the first vehicle 1210 is coupled to the charging device 1200 via a charging cable 1217 (e.g., comprising a signal line 209 and power cable 221 as described with reference to FIGS. 1-8) to provide electric power to the rechargeable battery system 1214 via the electric switching device 1215 as previously described with reference to FIGS. 1-9. In various embodiments, the charging cable 1217 is coupled to the charging input coupling 1211 with a cable coupling (e.g., a multi-contact coupler) 1218. As also further described below, the cable coupling 1218 may be of a standardized form to convey electric power and related signals, such as the power demand signal as previously described with reference to FIGS. 5-7.

In various embodiments, a second vehicle 1220 is parked adjacent to the first vehicle 1210. The second vehicle 1220 may be parked side-by-side with the first vehicle 1210, as shown in FIG. 12, parked behind or ahead of the first vehicle 1210, or otherwise parked in proximity to the first vehicle 1210. The second vehicle 1220 also incorporates a system 1202 analogous to the system 100. The system 1202 includes a charging input coupling 1221, a charging output coupling 1222, a battery system coupling 1223 coupled to the rechargeable battery system 1224 of the vehicle 1220, and an electric switching device 1225 which, in various embodiments, are electrically coupled by wiring harnesses or other conductive conduits as previously described with reference to FIGS. 1-9.

Whereas the charging input coupling 1211 of the first vehicle 1210 is coupled by the charging cable 1217 to the charging device 1200, the charging input coupling 1221 of the second vehicle 1220 is coupled by a charging cable 1227 to the charging output coupling 1212 of the first vehicle 1210. A first cable coupling (e.g., multi-contact coupler as described below with reference to FIGS. 14A and 14B) 1228 of the charging cable 1227 is coupled to the charging output coupling 1212 of the first vehicle 1210 and a second cable coupling (e.g., multi-contact coupler) 1229 of the charging cable 1227 is coupled to the charging input coupling 1221 of the second vehicle 1220. The interconnection of the systems 1201 and 1202 and the connection of the system 1201 to the charging device 1200 enables the rechargeable battery system 1214 of the first vehicle 1210 and the rechargeable battery system 1224 of the second vehicle 1220 to both be charged by the single charging device 1200.

As previously described with reference to FIGS. 5-8, each of the rechargeable battery systems 1214 and 1224 may generate a power demand signal receivable by the electric switching devices 1215 and 1225, respectively, to which each is coupled via their respective battery system couplings 1213 and 1223. For example, in a situation where both of the rechargeable battery systems 1214 and 1224 are below a specified charge level, both of the rechargeable battery systems 1214 and 1224 will present a power demand signal to their respective electric switching devices 1215 and 1225. Depending on the configuration of the electric switching device 1215 of the first vehicle 1210, the electric switching device 1215 may first direct electric power received from the charging device 1200 via the charging input coupling 1211 to the rechargeable battery system 1214 of the first vehicle 1210 or to the charging output coupling 1212 to provide the electric power to the second vehicle 1220.

As previously described with reference to FIG. 2, when the charging input coupling 1221 of the second vehicle 1220 is coupled to the charging output coupling 1212 of the first vehicle 1210, the charging output coupling 1212 of the first vehicle 1210 operates as the electric power source 250 (FIG. 2) for the second vehicle 1220. When one or more power demand signals are presented to the electric switching device 1225, the electric switching device 1225 communicates the power demand signal via the charging input coupling 1221 via the charging cable 1227 to the charging output coupling 1212 where, in turn, the power demand signal is communicated to the electric switching device 1215 and/or to the charging device. Accordingly, the electric switching device 1215 may determine whether and when to route electric power to the charging output coupling 1212.

As described with reference to FIGS. 5-8, the electric switching device 1215 may be configured to first direct electric power received from the charging device 1200 via the charging input coupling 1211 to the rechargeable battery system 1214 of the first vehicle 1210. When the rechargeable battery system 1214 reaches a predetermined charge level and, thus, no longer presents the power demand signal to the electric switching device 1215, the electric switching device 1215 may be configured to direct electric power received from the charging device 1200 via the charging output coupling 1212 to first recharge the rechargeable battery system 1224 of the second vehicle 1210 via the charging input coupling 1221, the electric switching device 1225, and the battery system coupling 1223.

It will be appreciated that, as previously described with reference to FIGS. 5-8, responsive to both of the rechargeable battery systems 1214 and 1224 presenting a power demand signal, the electric switching device 1215 instead may be configured to first direct the electric power from the charging device to the charging outlet coupling 1212 before directing power to the battery system coupling 1213 to charge the rechargeable battery system 1214. It also will be appreciated that when only one of the rechargeable battery systems 1214 or 1224 presents a power demand signal, the electric switching device 1215 will direct electric power to the rechargeable battery system 1214 or 1224 presenting the power demand signal.

In various embodiments the charging output coupling 1222 of the system 1202 of the second vehicle 1220 also may be coupled to one more additional vehicles or devices (not shown in FIG. 12). For example, the charging output coupling 1222 of the second vehicle 1220 may receive a charging cable 1237 that presents a multi-contact coupler 1239. The electric switching device 1225 may respond to power demand signals received via the charging output coupling 1222 via the charging cable 1227 from one or more other vehicles or external devices to provide electric power from the charging device 1200. Accordingly, in such embodiments more than two vehicles or electric devices may receive electric power from the charging device 1200 using embodiments of the system 100 (FIG. 1).

The charging cables 1217, 1227, and 1237 and their associated couplers 1218, 1228, 1222, and 1238 may be of a standardized form or topology. For example, the charging cables 1217, 1227, and 1237 and their associated couplers 1218, 1228, 1222, and 1238 may include Combined Charging System (CCS) cables and couplers, which are commonly used for the charging of electrically-powered vehicles. CCS couplings may be used to convey electric power and signals such as those previously described, as described below with reference to FIGS. 14A and 14B.

It should be appreciated that an external device coupled to the electric switching device 105 to switchably receive power need not include its own electric switching device 1225 as in the vehicle 1220 that represents the external device in FIG. 12. Referring additionally to FIG. 13, a first vehicle 1310 incorporates a system 1301 analogous to the system 100 to enable electric power to be directed to a rechargeable battery system 1314 of the first vehicle 1310 or direct electric power to an external device. As in various embodiments, in the example of FIG. 13, the external device is a second vehicle 1320 that seeks power to recharge a rechargeable battery system 1324 of the second vehicle 1320. However, in contrast to the example of FIG. 12, the second vehicle 1320 does not include an electric switching device of the system 100 and does not include a charging output coupling or a second switchable coupling to provide power to a further external device.

As in the example of FIG. 12, the first vehicle 1310 is parked adjacent to the charging device 1300. In various embodiments the system 1301 includes a charging input coupling 1311, a charging output coupling 1312, a battery system coupling 1313 coupled to the rechargeable battery system 1314 of the vehicle 1310, and an electric switching device 1315 which, in various embodiments, are electrically coupled by wiring harnesses or other conductive conduits as previously described with reference to FIGS. 1-9. The charging input coupling 1311 of the first vehicle 1310 is coupled to the charging device 1300 via a charging cable 1317 (e.g., comprising a signal line 209 and power cable 221 as described with reference to FIGS. 1-8) to provide electric power to the rechargeable battery system 1314 via the electric switching device 1315 as previously described with reference to FIGS. 1-9. In various embodiments, the charging cable 1317 is coupled to the charging input coupling 1311 with a cable coupling (e.g., a multi-contact coupler) 1318. As also further described below, the cable coupling 1318 may be of a standardized form to convey electric power and related signals, such as the power demand signal as previously described with reference to FIGS. 5-9.

In various embodiments, the second vehicle 1320 (or other external device) is positioned adjacent to the first vehicle 1310. As previously described, however, the second vehicle 1320 does not incorporate an electric switching device to selectively passthrough electrical power to another vehicle or external device. The vehicle 1320 may include a charging input coupling 1321 and a battery system coupling 1323 coupled to the rechargeable battery system 1324 of the vehicle 1320. When the external device is not another vehicle, it will be appreciated that the external device may not include a charging input coupling but, instead, may include a fixedly attached charging cable, for example, if the external device is an auxiliary battery pack. The vehicle 1320 also may include a sensing device 1395 operable to determine when the battery system 1324 requires charging and to communicate a power demand signal via a signal line through the battery system coupling 1323 (or fixed cable) to the electric switching device 1315 of the first vehicle 1310.

As previously described, the electric switching device 1315 of the first vehicle 1310 may direct electric power received from the charging device to the battery system 1314 of the first vehicle 1310 or direct electric power received from the charging device to the second vehicle 1320 to charge its battery system 1324. Because the second vehicle 1320 does not include an electric switching device like the electric switching device 1315 of the first vehicle, the second vehicle 1320 (or other external device so configured and connected) serves as the end of the chain because the second vehicle 1320 is not switchably couplable to another external device.

As previously described, the cables and couplings may include standardized CCS couplings, which may be of various forms may include multiple different forms. Referring additionally to FIG. 14A, for example, a CCS Type 1 connector 1400 is coupled to multi-conductor cable 1401. The connector 1400 includes a positive direct current (DC) pin 1402 and a negative DC pin 1403. The connector 1400 also includes additional power pins 1411 and 1412 that may be configured to convey either DC or alternating current (AC) power. Signal lines 1413 and 1414 may be configured to convey signals, such as the power demand signals previously described with reference to FIGS. 5-7. A ground pin 1415 may be used to ground a chassis of the vehicle during charging.

Figure 14B:
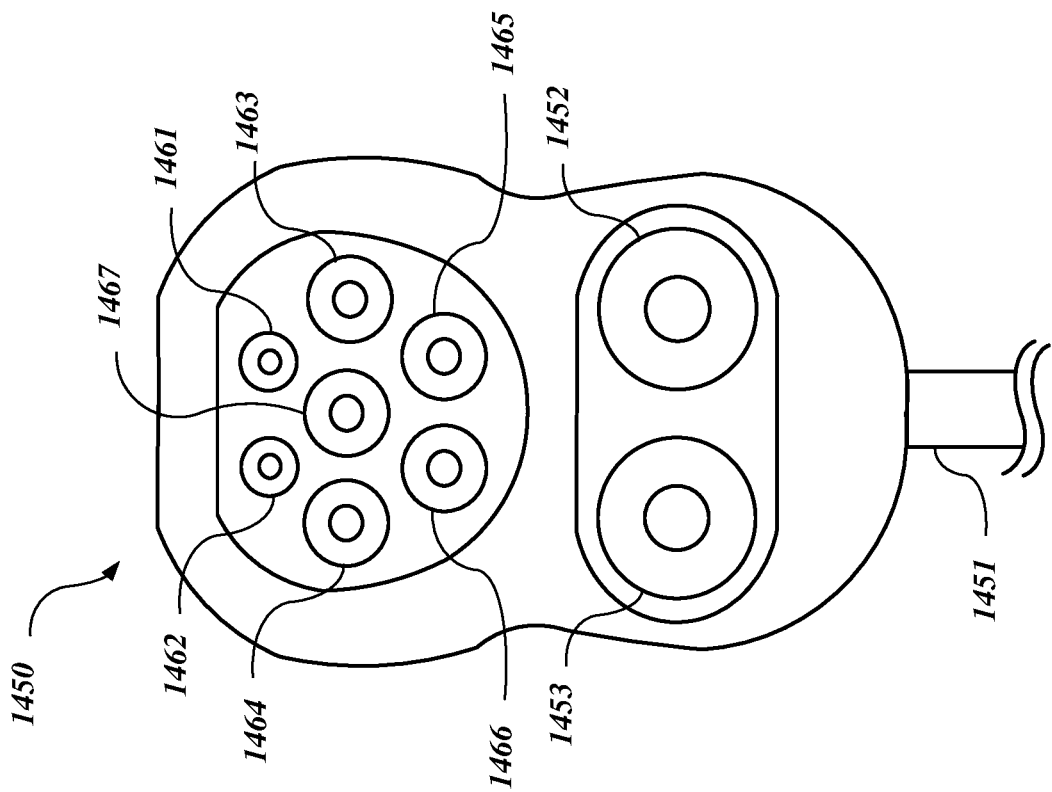
FIGS. 14A and 14B are schematic views of illustrative combined charging system (CCS) couplings usable with the system of FIGS. 1-7.
Figure 14A:
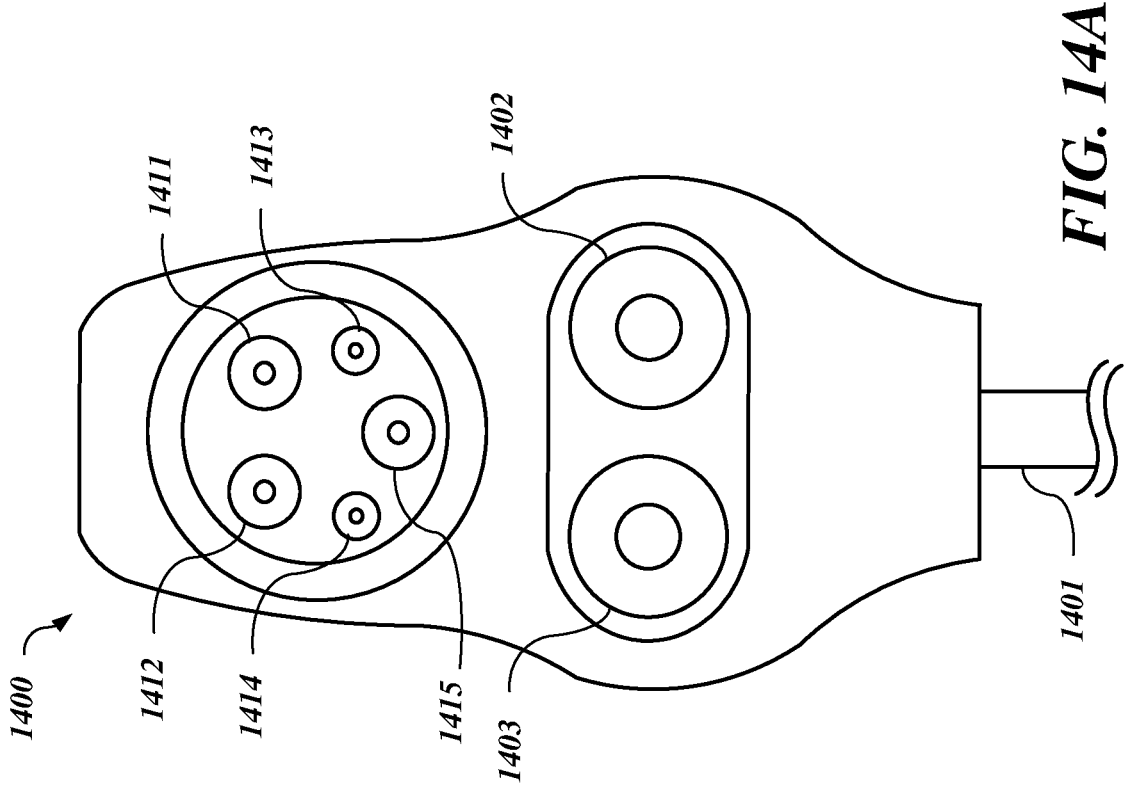

Referring additionally to FIG. 14B, for another example, a CCS Type 2 connector 1450 is coupled to multi-conductor cable 1451. The connector 1450 includes a positive DC pin 1452 and a negative DC pin 1453. The connector 1450 also includes two pairs of additional power pins 1463 and 1464 and 1465 and 1466 that may be used to provide, for example, AC current at different phases. Signal lines 1461 and 1462 may be configured to convey signals, such as the power demand signals previously described with reference to FIGS. 5-9. A ground pin 1467 may be used to ground a chassis of the vehicle during charging.

In various embodiments the CCS connectors of FIGS. 14A and 14B, or other CCS connectors or non-CCS connectors may be used to connect the system 100 (FIG. 1) to a source of electric power via the charging input coupling 101 and/or to connect the charging output coupling to an external device or system, as previously described. The connectors may convey either DC or AC power to or from the couplings 101 and 102 as well as signals, such as power demand signals as previously described with reference to FIGS. 5-9.

Figure 15:
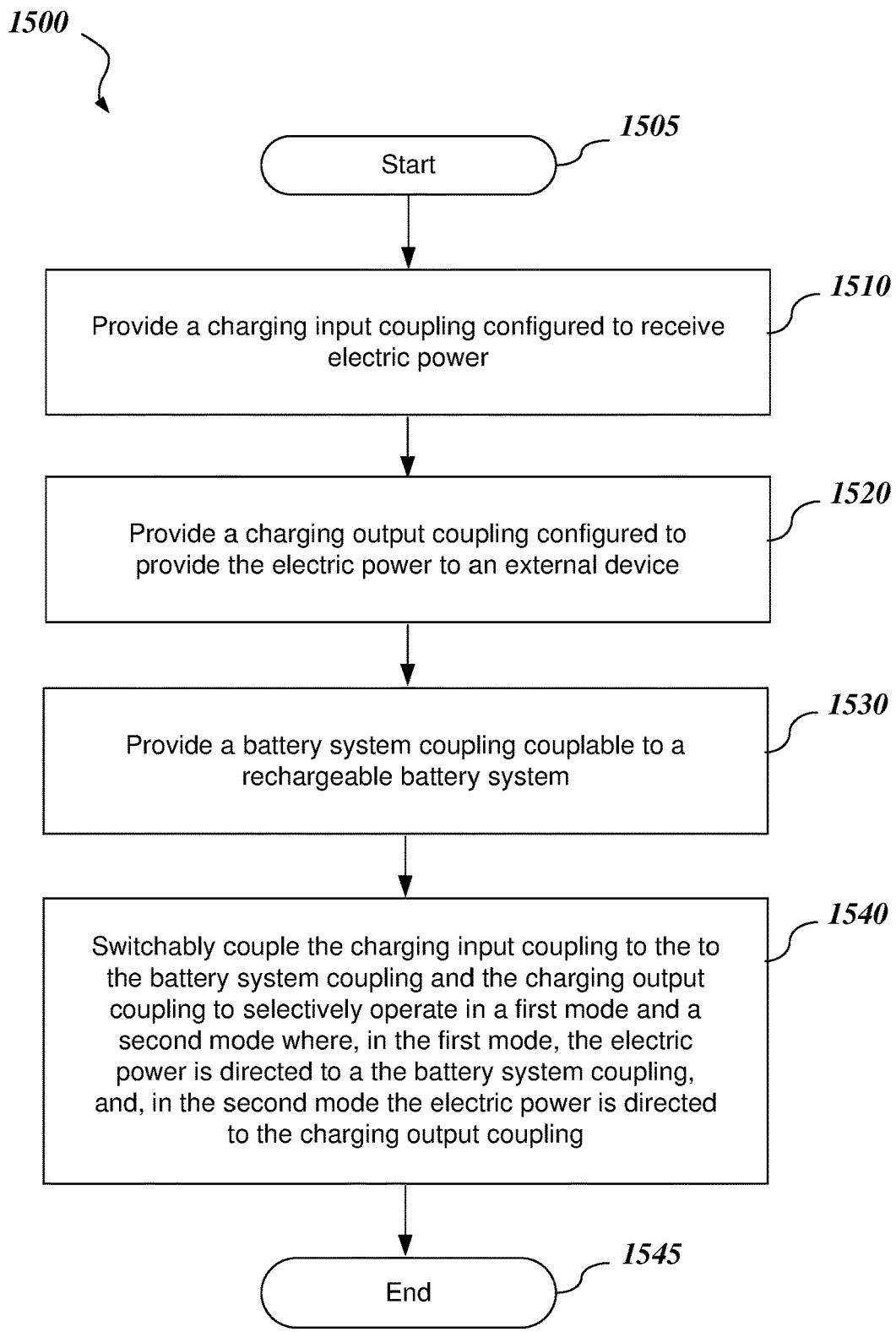
FIG. 15 is a flow chart of an illustrative method to switchably directly electric power between a battery system and another device.

Referring to FIG. 15, an illustrative method 1500 is provided to switchably provide electric power to a battery system and an external system, from a single charging system or other source of electric power. The method 1500 starts at a block 1505. At a block 1510, a charging input coupling configured to receive electric power is provided. At a block 1520, a charging output coupling configured to provide the electric power to an external device is provided. At a block 1530, a battery system coupling couplable to a rechargeable battery system is provided. At a block 1540, the charging input coupling switchably couples the charging input coupling to the battery system coupling and the charging output coupling to selectively operate in a first mode and a second mode where, in the first mode, the electric power is directed to the battery system coupling, and, in the second mode, the electric power is directed to the charging output coupling. The method ends at a block 1545.

In various embodiments, the method also may include detecting first power demand signal at the battery system coupling and a second power demand signal at the charging output coupling. In various embodiments, the method also may include, responsive to detecting the first power demand signal, directing the electric power either the battery system coupling in response to detecting the first power demand signal or to the charging output coupling in response to detecting the second power demand. In various embodiments, the method also may direct the electric power to either the battery system coupling or the charging output coupling in sequence by, for example, first directing the electric power to the battery system coupling to recharge the first rechargeable battery system then directing the electric power to the charging output coupling to provide the electric power to the external device or first directing the electric power to the charging output coupling to provide the electric power to the external device then directing the electric power to the battery system coupling to recharge the first rechargeable battery system. In various embodiments, the method also may selectively direct the electric power from a single source of electric power to the battery system coupling and the charging output coupling. In various embodiments, the method also may include configuring the charging input coupling and the charging output coupling to receive Combined Charging System (CCS) couplings.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

It will be appreciated that the detailed description set forth above is merely illustrative in nature and variations that do not depart from the gist and/or spirit of the claimed subject matter are intended to be within the scope of the claims. Such variations are not to be regarded as a departure from the spirit and scope of the claimed subject matter.

What is claimed is:
1. A system comprising:
   a charging input coupling couplable to an electric power source;
   a charging output coupling;
   a battery system coupling couplable to a rechargeable battery system; and
   an electric switching device electrically couplable to the charging input coupling, the charging output coupling, and the battery system coupling, and configured to selectively operate in an operating mode including at least one of a first mode and a second mode, wherein:
      in the first mode, the electric switching device directs the electric power to the battery system coupling, and in the second mode, the electric switching device directs the electric power to the charging output coupling.

2. The system of claim 1, wherein the electric switching device is configured to detect a first power demand signal indicative of a request for power from the rechargeable battery system at the battery system coupling and a second power demand signal indicative of a request for power from an external device at the charging output coupling.

3. The system of claim 2, wherein the electric switching device is configured to operate in the first mode in response to detecting the first power demand signal and operate in the second mode in response to detecting the second power demand signal.

4. The system of claim 3, wherein, responsive to detecting both the first power demand signal and the second power demand signal, the electric switching device is configured to select the operating mode in a sequence chosen from a first sequence and a second sequence wherein:
in the first sequence, the electric switching device operates initially in the first mode, and then the second mode; and
in the second sequence, the electric switching device operates initially in the second mode, and then the first mode.

5. The system of claim 1, wherein the rechargeable battery system includes a vehicle battery system of a first vehicle and the charging output coupling is configured to be coupled to a second vehicle.

6. The system of claim 5, wherein the charging input coupling is configured to receive the electric power from a vehicle charging system configured to charge a single vehicle battery system at one time.

7. The system of claim 2, wherein:
in response to detecting the first power demand signal, the electric switching device is configured to convey the first power demand signal from the battery system coupling to the charging input coupling; and
in response to detecting the second power demand signal, the electric switching device is configured to convey the second power demand signal from the charging output coupling to the charging input coupling.

8. The system of claim 1, wherein the charging input coupling and charging output coupling each includes a Combined Charging System (CCS) coupling.

9. A vehicle comprising:
a vehicle body;
a drive system;
a rechargeable battery system;
a charging input coupling configured to receive electric power;
a charging output coupling;
a battery system coupling couplable to the rechargeable battery system; and
an electric switching device electrically couplable to the charging input coupling, the charging output coupling, and the battery system coupling, and configured to selectively operate in an operating mode including at least one of a first mode and a second mode, wherein:
in the first mode, the electric switching device directs the electric power to the battery system coupling, and
in the second mode, the electric switching device directs the electric power to the charging output coupling.

10. The vehicle of claim 9, wherein the electric switching device is configured to detect a first power demand signal indicative of a request for power from the rechargeable battery system at the battery system coupling and a second power demand signal indicative of a request for power from an external device at the charging output coupling.

11. The vehicle of claim 10, wherein the electric switching device is configured to operate in the first mode in response to detecting the first power demand signal and operate in the second mode in response to detecting the second power demand signal.

12. The vehicle of claim 10, wherein, responsive to detecting both the first power demand signal and the second power demand signal, the electric switching device is configured to select the operating mode in a sequence chosen from a first sequence and a second sequence wherein:
in the first sequence, the electric switching device operates initially in the first mode, and then the second mode; and
in the second sequence, the electric switching device operates initially in the second mode, and then the first mode.

13. The vehicle of claim 12, wherein the charging input coupling is configured to receive the electric power from a vehicle charging system configured to charge a single vehicle battery system at one time.

14. The vehicle of claim 9, wherein the charging input coupling and charging output coupling each includes a Combined Charging System (CCS) coupling.

15. A method comprising:
providing a charging input coupling configured to receive electric power;
providing a charging output coupling configured to provide the electric power to an external device;
providing a battery system coupling couplable to a rechargeable battery system; and
switchably coupling the charging input coupling to the battery system coupling and the charging output coupling to selectively operate in a first mode and a second mode wherein:
in the first mode, directing the electric power to the battery system coupling, and
in the second mode, directing the electric power to the charging output coupling.

16. The method of claim 15, further comprising detecting a first power demand signal indicative of a request for power from the rechargeable battery system at the battery system coupling and detecting a second power demand signal indicative of a request for power from an external device at the charging output coupling.

17. The method of claim 16, further comprising operating in the first mode in response to detecting the first power demand signal and operating in the second mode in response to detecting the second power demand signal.

18. The method of claim 17, further comprising, responsive to detecting both the first power demand signal and the second power demand signal, selecting the operating mode in a sequence chosen from a first sequence and a second sequence wherein:
in the first sequence, operating initially in the first mode, and then the second mode; and
in the second sequence, operating initially in the second mode, and then the first mode.

19. The method of claim 16, further comprising selectively directing the electric power from a single source of electric power to the battery system coupling and the charging output coupling.

20. The method of claim 16, further comprising:
in response to detecting the first power demand signal, conveying the first power demand signal from the battery system coupling to the charging input coupling; and
in response to detecting the second power demand signal, conveying the second power demand signal from the charging output coupling to the charging input coupling.

\* \* \* \* \*